(12) United States Patent
Burt et al.

(10) Patent No.: US 10,551,813 B2
(45) Date of Patent: Feb. 4, 2020

(54) USING ESTIMATED SCHEDULES AND ANALYSIS OF ZONE TEMPERATURE TO CONTROL AIRFLOW

(71) Applicant: CopperTree Analytics Ltd., Surrey (CA)

(72) Inventors: Jason Burt, Seattle, WA (US); Brice Kosnik, Snohomish, WA (US)

(73) Assignee: CooperTree Analytics Ltd., Surrey (CA)

( * ) Notice: Subject to any disclaimer, the term of this patent is extended or adjusted under 35 U.S.C. 154(b) by 0 days.

(21) Appl. No.: 15/498,444

(22) Filed: Apr. 26, 2017

(65) Prior Publication Data

US 2017/0307243 A1    Oct. 26, 2017

Related U.S. Application Data (60) Provisional application No. 62/327,654, filed on Apr. 26, 2016.

(51) Int. Cl.
 *G05B 19/048* (2006.01)
 *G05D 23/19* (2006.01)
 (Continued)

(52) U.S. Cl.
 CPC ............ *G05B 19/048* (2013.01); *F24F 11/30* (2018.01); *F24F 11/46* (2018.01); *F24F 11/62* (2018.01);
 (Continued)

(58) Field of Classification Search
 CPC ........... G05B 19/048; G05B 2219/2614; F24F 11/77; F24F 11/62; F24F 11/30;
 (Continued)

(56) References Cited

U.S. PATENT DOCUMENTS 5,678,758 A * 10/1997 Takegawa .......... G05D 23/1904
    236/46 R
5,729,474 A *  3/1998 Hildebrand ........ G05D 23/1917
    700/276
(Continued)

FOREIGN PATENT DOCUMENTS

EP    2903217 A1    8/2015

OTHER PUBLICATIONS

Alex Beltran, Varick L. Erickson, and Alberto E. Cerpa. 2013. ThermoSense: Occupancy Thermal Based Sensing for HVAC Control. In Proceedings of the 5th ACM Workshop on Embedded Systems for Energy-Efficient Buildings (BuildSys'13). ACM, New York, NY, USA, , Article 11 , 8 pages. (Year: 2013).*

(Continued)

*Primary Examiner* — Christopher E. Everett
(74) *Attorney, Agent, or Firm* — Perkins Coie LLP (57) ABSTRACT

A facility providing systems and methods for demand control ventilation for a building, or a portion/portions thereof, using a combination of scheduling and environment sensors for fallback is disclosed. The facility for demand control ventilation modulates the volume exchange of outside air into an enclosed space (i.e., air that is external to the enclosed space) by mechanical air conditioning equipment or ventilation system, such as a fan, a Heating, Ventilation, and Air Conditioning (HVAC) system, and so on. Demand control ventilation is used not only to ensure that people within buildings have an allotted amount of fresh air but also to provide a cost savings to users, as a lower amount of airflow can reduce energy use and, therefore, energy costs.

20 Claims, 3 Drawing Sheets

(51) Int. Cl.
*F24F 11/30* (2018.01)
*F24F 11/62* (2018.01)
*F24F 11/64* (2018.01)
*F24F 11/46* (2018.01)
*F24F 11/77* (2018.01)
*G05B 15/02* (2006.01)
*F24F 11/00* (2018.01)
*F24F 110/10* (2018.01)
*F24F 120/10* (2018.01)
*F24F 120/12* (2018.01)

(52) U.S. Cl.
CPC .............. *F24F 11/64* (2018.01); *F24F 11/77* (2018.01); *G05B 15/02* (2013.01); *G05D 23/1904* (2013.01); *F24F 2011/0002* (2013.01); *F24F 2110/10* (2018.01); *F24F 2120/10* (2018.01); *F24F 2120/12* (2018.01); *G05B 2219/2614* (2013.01)

(58) Field of Classification Search
CPC ........ F24F 11/64; F24F 11/46; F24F 2120/10; F24F 2120/12; F24F 2110/10; F24F 2011/0002; G05D 23/1904
See application file for complete search history.

(56) References Cited

U.S. PATENT DOCUMENTS

| | | | | |
|---|---|---|---|---|
| 2003/0096572 A1* | 5/2003 | Gutta | .................. | F24F 11/30 454/229 |
| 2003/0199244 A1 | 10/2003 | Siddaramanna et al. | | |
| 2006/0105697 A1* | 5/2006 | Aronstam | ............ | F24F 11/0001 454/256 |
| 2006/0185373 A1* | 8/2006 | Butler | .................... | F25B 49/02 62/181 |
| 2008/0076346 A1 | 3/2008 | Ahmed et al. | | |
| 2008/0277486 A1 | 11/2008 | Seem et al. | | |
| 2010/0282857 A1* | 11/2010 | Steinberg | ............. | F24F 11/0001 236/49.3 |
| 2010/0318227 A1* | 12/2010 | Steinberg | ............... | F24F 11/006 700/278 |
| 2011/0127340 A1* | 6/2011 | Aiken | ................. | F24F 11/0001 236/49.3 |
| 2011/0153090 A1* | 6/2011 | Besore | .................. | G05B 15/02 700/278 |
| 2012/0066168 A1* | 3/2012 | Fadell | .................... | G05B 15/02 706/52 |
| 2013/0030732 A1* | 1/2013 | Shetty | ................... | G01D 4/002 702/62 |
| 2013/0073094 A1* | 3/2013 | Knapton | ................ | G05B 13/02 700/278 |
| 2013/0261808 A1* | 10/2013 | Besore | .............. | G05D 23/1904 700/278 |
| 2015/0159893 A1* | 6/2015 | Daubman | ............. | G05B 15/02 700/278 |
| 2015/0211761 A1* | 7/2015 | Copley | .................. | F24F 11/006 700/276 |
| 2015/0316286 A1* | 11/2015 | Roher | ...................... | F24F 11/30 700/276 |
| 2015/0330652 A1 | 11/2015 | Kim | | |
| 2016/0377305 A1* | 12/2016 | Kwa | ...................... | F24F 11/006 700/277 |
| 2017/0074541 A1* | 3/2017 | Bentz | ...................... | H04W 4/80 |

OTHER PUBLICATIONS

International Search Report and Written Opinion dated Jul. 27, 2017 in International Application No. PCT/US2017/029721, 16 pages.

\* cited by examiner

USING ESTIMATED SCHEDULES AND ANALYSIS OF ZONE TEMPERATURE TO CONTROL AIRFLOW

CROSS-REFERENCE TO RELATED APPLICATION(S)

This application claims priority to U.S. Provisional Patent Application No. 62/327,654 filed on Apr. 26, 2016, titled "USING ESTIMATED SCHEDULES AND ANALYSIS OF ROOM TEMPERATURE TO CONTROL AIRFLOW FOR ROOMS—DEMAND CONTROL VENTILATION," the contents of which are herein incorporated by reference in its entirety. This application is related to PCT Application No. PCT/US2017/029721 filed on Apr. 26, 2017, titled "USING ESTIMATED SCHEDULES AND ANALYSIS OF ROOM TEMPERATURE TO CONTROL AIRFLOW," the contents of which are herein incorporated by reference in its entirety. In cases where the present application and a document incorporated herein by reference conflict, the present application controls.

BACKGROUND

Typical systems for determining and controlling ventilation within a building or a room (zones) are based on maximum occupancy of the building or room or by using a counter to count the number of individuals present. Basing ventilation on maximum occupancy of the building or room often uses more energy than is required—because often times the building or room is not at capacity—and, therefore, reduces the lifetime of the equipment. Furthermore, these systems often use carbon dioxide ($CO_2$) sensors to determine the total amount of $CO_2$ in a building or room. In addition to the cost of the $CO_2$ sensors, they also require periodic checks to ensure that they are reporting correctly. A technique for providing demand control ventilation with increased ability meet the demands of the occupants and/or with reduced initial setup cost, hardware cost, and overhead is desired.

DETAILED DESCRIPTION

A facility providing systems and methods for demand control ventilation for a building, or a portion/portions thereof, using a combination of scheduling and environment sensors for fallback is disclosed. As used herein, ventilation is measured in (and referred to, in some cases, as) cfm (cubic feet per minute) of air, but can be measured according to any ratio of volume to time (e.g., liters per hour). In some embodiments, the facility for demand control ventilation modulates the volume exchange of outside air into an enclosed space (i.e., air that is external to the enclosed space) by mechanical air conditioning equipment or ventilation system, such as a fan, a Heating, Ventilation, and Air Conditioning (HVAC) system, and so on. Demand control ventilation is used not only to ensure that people within buildings have an allotted amount of fresh air, (e.g., air with a certain Carbon Dioxide ($CO_2$) range, such as 800 ppm above outdoor air $CO_2$ ppm), but also to provide a cost savings to users (e.g., building owners, building operators/managers, occupants, etc.), as a lower amount of airflow can reduce energy use and, therefore, energy costs.

In some embodiments, the disclosed facility provides techniques for creating control feedback for buildings that can estimate the correct amount of outside airflow into a space/room as determined, for example, by law or industry standard, such as ASHRAE (American Society of Heating, Refrigerating, and Air-Conditioning Engineers), user/administrator preference, and so on. For example, rather than allowing a ventilation system to cause outside air to flow into a room based solely on the maximum occupancy of the room, the facility can be configured to control the outside flow of air into the room based on 1) the number of occupants expected or estimated to be in the room during a certain period and 2) a designated rate of airflow, such as any one or more common industry standards (e.g., the amount of airflow prescribed by an industry standard for the estimated number of people in the room), user preferences, etc.

In some embodiments, the facility can be configured to determine adequate ventilation for a room or building based on a schedule with an estimated occupancy and Temperature settings (e.g., a thermostat schedule) for the room or building. For example, a calendar with an estimated occupancy schedule, such as a school calendar with classrooms and student numbers (i.e., the number of students in each class), can be used to set an expected room occupancy and a thermostat schedule for the room can be used to estimate temperature settings for the room over time. A schedule for a classroom could indicate that the room is supposed to have 20 people in it over a period of time (e.g., M-F, 8:00 AM to 3:00 PM). Once the number of people is calculated or estimated, this number can be multiplied by a cfm per occupant value provided by industry standard or local law (e.g., 200 cfm per occupant). In this example, the amount of total ventilation would be 4000 cfm (i.e., 20 people*200 cfm/occupant (sample industry standard).

In some embodiments, as a safety fallback to increase ventilation, if the rate of change in the room temperature is outside of an estimated limit for the number of people in the room (i.e., if the room is warming too fast), the ventilation can be increased based on an estimated number of people in the room. For example, a schedule for a classroom could indicate that the room is expected to have 20 people in it, but the rate of change of temperature in the room is different from the last time there were 20 people in the room (i.e., the room is getting warmer faster than the last time, such as 0.1 degrees (Fahrenheit or Celsius) per minute (this time) vs. 0.04 (historical average) degrees (Fahrenheit or Celsius) per minute). One of ordinary skill in the art will recognize that different thresholds may be establish "similarity" between rates of temperature change (e.g., 0.05 degrees per minute, 4 degrees per hour, 1 degree per minute, and so on). In this case, the facility can compare the temperature change with other known historical occupancies to estimate the number of people in the room. For example, the facility may maintain a library of records that relates temperature change to occupancy for a set of rooms or buildings and use these libraries to estimate an occupancy for a room given its size (volume) and temperature change. Once the number of people is calculated or estimated this number can be multiplied by a cfm per occupant value provide by industry standard or local law. In some embodiments, as discussed in further detail below, the lower cfm limit can be calculated using external weather conditions in addition to the room temperature.

The disclosed technology offers several benefits over other techniques for controlling ventilation in a room and/or building. As discussed above, typical ventilation systems rely on occupancy sensors, $CO_2$ sensors, or solely on maximum occupancy values. Accordingly, ventilation systems that rely on occupancy sensors and/or $CO_2$ sensors require the acquisition and installation of occupancy sensors and/or $CO_2$ sensors, which can be problematic and/or costly to acquire and/or install. The disclosed techniques can solve these problems related to ventilation systems that rely on occupancy sensors and/or $CO_2$ sensors with the use of a thermostat. Because most rooms have a thermostat, using the thermostat as a fallback for an occupancy sensor reduces the initial setup cost, hardware cost, and overhead of calibration of $CO_2$ sensors or occupancy hardware that is required fqr other forms of demand control ventilation, thereby providing significant advantages over those ventilation systems that rely on occupancy sensors and/or $CO_2$ sensors. Similarly, the disclosed techniques solve problems related to ventilation systems that rely solely on maximum occupancy values, which tend to be inefficient when, as is usually the case, a room or building is not at capacity. In these cases, the room or building may be over-ventilated since the ventilation system is configured to meet the demands of the maximum occupancy as opposed to an actual or estimated occupancy. Over-ventilation may cause unnecessary wear and tear on components of the ventilation system, thereby reducing the useful life of these components. In contrast, the disclosed facility provides techniques to base the ventilation of a room or building on the number of occupants in the room or building or estimated to be in a room or building rather than relying solely on a maximum occupancy value. In this manner, the room or building is ventilated in accordance with an estimate of the actual number of people in the room or building, rather than the number of people that can safely fit therein. Ventilating the room or building in this manner requires less energy and is therefore more efficient, thereby solving the above-mentioned efficiency problem and providing significant advantages over ventilation systems that rely solely on maximum occupancy values. In short, the disclosed facility improves the ability of ventilation systems to provide airflow to rooms and buildings efficiently, thereby conserving both energy and other resources and solves several problems presented by prior ventilation systems.

Example—Basic Schedule Calculation

In some embodiments, the facility receives a ventilation schedule for a room as described in the classroom example below. Initially, the facility receives maximum occupancy information for the classroom by, for example, receiving a value from a user, preconfigured hardware in the classroom (e.g., a thermostat), and so on. In this example, the maximum occupancy of the classroom is 100. The schedule provided in Table 1 below is used for this example.

TABLE 1

| Schedule Period | Total time | Estimated Occupancy | Max CFM | Calculated CFM |
| --- | --- | --- | --- | --- |
| 9am-10am | 1 HR | 40 | 1000 | 400 |
| 10am-11am | 1 HR | 100 | 1000 | 1000 |
| 11am-5pm | 6 HR | 40 | 1000 | 400 |

In this example, at the beginning of the day (i.e., 9 am in this example), the classroom schedule indicates that the classroom is expected to have 40 people in it; at 10 am, the classroom has an expected occupancy of 100 people (max capacity), and for the rest of the day until 5 pm the room goes back to an expected occupancy of 40 people. For each scheduling period, the facility calculates a low limit cfm for the room (i.e., the minimal amount of fresh or outdoor air that must be ventilated into the room per minute based on, for example, industry standards, user preferences, etc.) based on an actual or estimated occupancy for the room, a max occupancy for the room, and the max airflow for the room (i.e., max cfm for the room's ventilation system, which can be determined by ratings or settings for the system, a manufacturer's manual for the system, or input directly by a user of the system).

For example, Low Limit CFM for the room is calculated for 9 am-10 am as follows:
    Max Flow (of ventilation system)
        maximum occupancy*cfm per occupant (provided, for example, by standard, law, or user preference)
        100 people*10 cfm per occupant
        1000 cfm
    Required flow
        Equation
            Max Flow*(Number of people in room/Total Capacity of Room)
        Example Calculation
            1000 cfm*(40/100)=400 cfm.

Similarly, a Low Limit CFM for the room is calculated for 10 am-11 am as follows:
    Max Flow (of ventilation system)
        maximum occupancy*cfm per occupant
        100 people*10 cfm per occupant
        1000 cfm
    Required flow
        Example Calculation
            1000 cfm*(100/100)=1000 cfm.

Similarly, a Low Limit CFM for the room is calculated for 11 am-5 pm.
    Max Flow (of ventilation system)
        maximum occupancy*cfm per occupant
        100 people*10 cfm per occupant
        1000 cfm
    Required flow
        Example Calculation
            1000 cfm*(40/100)=400 cfm.

Using Room Temperature and External Weather Variables for Fallback

In some embodiments, the facility may be further configured to incorporate room temperature and weather variables (and/or other external factors) into ventilation determinations. Though a schedule can act as a good starting place, there is the potential for the room occupancy to be greater than or less than the anticipated occupancy of the room. For example, a classroom may have one or more absent students, a number of visitors to the classroom, or a scheduling change for the classroom. As a safety feature, the facility can use the Room Temperature and/or the rate of change thereof to further refine the estimate of the occupancy in the room. As the number of people in the room increases, the rate of change of the temperature of the room can increase as the occupants act as a heating source for the room. Using historical data for the occupancy and temperature, if the current rate of change in the Room Temperature is significantly more than a prior average for the same occupancy (e.g., more than one standard deviation above the historical mean, more than 115% of the historical mean, more than 5 degrees higher than the mean, and so on), ventilation can be added to the room to avoid issues with airflow by, for example, increasing the airflow by a predetermined number (e.g., 10, 20, 50, 100) or percentage (e.g., 5%, 15%, 50%) of cfm per occupant (or estimated occupant). For example, if the difference between the measured rate of change in the Room Temperature and a mean value for the rate of change in the Room Temperature over a predetermined period is greater than a predetermined value (e.g., 0.05 degrees per minute, 2 degrees per hour, greater than 10% more, and so on), then the facility can increase the level of ventilation into the room. As another example, if the difference between the measured rate of change in the Room Temperature and a mean value for the rate of change in the Room Temperature over a predetermined period is greater than a predetermined number of standard deviations for the rate of change in the Room Temperature over a predetermined period, then the facility can increase the level of ventilation into the room.

Example—Using Room Temperature Change to Identify Increase Occupancy

Rate of change in Room Temperature calculation is the change in temperature over a certain time. For example, if the temperature is 70° F. at 10 am and changes to 71° F. after 10 minutes, the rate of change would be 0.5° F. per 5 minutes. In some embodiments, if the rate of change of Room Temperature indicates that a calculated low limit cfm is too low (e.g., If the rate of change of Room Temperature exceeds a predetermined threshold or if the Room Temperature is greater than a predetermined threshold), then the facility can adjust the mechanical air conditioning equipment or ventilation system to increase ventilation. For example, if a room is estimated to have a scheduled airflow of 400 cfm but its rate of temperature change is closer to a room with requiring 1000 cfm (e.g., a room at maximum capacity in this example), the system could fall back to the higher airflow which would be the max occupancy of the room multiplied by a cfm per occupant standard (i.e., 100*10 cfm per occupant=1000 cfm) to ensure that the room is comfortable for its occupants (i.e., adjust the ventilation to the higher airflow). For example, Table 2 below represents a set of recorded values for a classroom over the course of a day (from 10 am to 2 pm in this example). In this case, the corresponding room shows an estimated occupancy of 40 people from 1 pm to 2 pm but a temperature rate of change of 1 degree per five minutes, which most closely equates to the temperature rate of change for the room with an estimated occupancy of 100 (11 am-12 pm), rather than 40 (10 am-11 am and 12 pm-1 pm, each of which has a temperature rate of change of 0.5 degrees per five minutes). Thus, the facility may rely on the safety fallback settings to ventilate the room from 1 pm to 2 pm at the higher rate (i.e., 200 cfm per occupant) because its temperature rate of change is closer to the temperature rate of change for a room with 100 people than 40 people. In other words, the facility can adjust ventilation settings (e.g., fan speed, fan direction, the "openness" of one or more vents, the direction of one or more vents, etc.) to account for rates of change of room temperature by identifying and executing historical ventilation settings that more closely match the current environment. In this manner, the facility can ensure that the ventilation of the room is adequate to meet an established standard and/or a preference for the occupants, manager, owner, etc.

TABLE 2

| Schedule time | Total time | Estimated Occupancy | Max CFM low limit | Schedule Estimated CFM Low Limit | Temperature Rate of Change (per 5 minutes) | Safety Fallback |
|---|---|---|---|---|---|---|
| 10am-11am | 1 HR | 40 | 200 | 80 | .5 | no |
| 11am-12pm | 1 HR | 100 | 200 | 200 | 1 | no |
| 12pm-1pm | 1 HR | 40 | 200 | 80 | .5 | no |
| 1pm-2pm | 1 HR | 40 | 200 | 80 | 1 | yes |

In some embodiments, the facility may have access to additional sensors or data sources that provide additional information about the environment in which the facility is operating. For example, the facility may be installed in a building with light sensors, humidity sensors, outside air temperature sensors, and so on. Additionally, the facility may be able to retrieve this information from third party sources, such as a data source that provides current weather information. In these cases, the accuracy of the facility can be improved by comparing the rate of change of Room Temperature to environmental variables, such as the outside air temperature, humidity, sunlight, and so on to produce an estimate on the amount of airflow that should be added to the room where these measures are available. For example, if there was a high humidity the amount of outside air (cfm) per occupant could be increased as to increase the amount of oxygen flowing into the room. As another example, the luminosity or illuminance of the sun or other light sources could be used to estimate that the room would be heating more rapidly because it's sunny outside. Furthermore, the time of sunset can be used to predict a reduction in the rate of change of temperature. In some embodiments, the facility may store associations of cfm adjustments (cfm per occupant) with various environmental variables. For example, a cfm adjustment library or store may relate humidity with cfm adjustments according to a formula (e.g., $C_{humidity}$*humidity percentage), where $C_{humidity}$ is a predetermined constant (e.g., 0.01, 0.03, 0.3, 0.7, 2, etc.). Thus, if the outside humidity is 70%, then the facility would adjust the cfm per occupant by 0.03*70, or 2.1 cfm per occupant. As another example, a cfm adjustment library may relate luminance on a particular surface (or set of surfaces) associated with the room or building with cfm adjustments according to a formula (e.g., $C_{luminance}$*luminance), where $C_{luminance}$ is a predetermined constant (e.g., 0.001, 0.3, 3, etc.). In some cases, the cfm adjustment library may store concrete values in association with environmental variables. For example, a humidity of 70% may be associated with an adjustment of 5 cfm per occupant while a humidity of 35% and below is associated with an adjustment of 0 cfm per occupant.

Using Outside Environmental Conditions, Room Temperature, and Occupancy Schedule to Predict Airflow In some embodiments, the facility may generate a dataset of external environment conditions, internal Room temperatures, and estimated occupancy. The dataset may be generated by periodically polling conditions within a room and external to the room storing this information as a sort of profile for various settings in the room. For example, the dataset can include historical settings for occupancy, cfm, scheduling, date, time, etc. for a room. Using this dataset and the historical information that it represents, the facility can determine whether it needs to override a low level cfm based on conditions with the room. Furthermore, the facility can access the dataset to find and rely on settings that were used during a previous, similar set of conditions to increase comfort within the room. Moreover, this dataset can be used to predict increased ventilation for certain periods. For example, if a room is scheduled to be occupied by 40 people at 10 am every day and the outside temperature is 70° F. most days but the rate of temperature change increases on one Tuesday and one Thursday, then facility can adjust ventilation in the room on those days to provide an increased low limit CFM and ensure that the room will be comfortable.

TABLE 3

| Schedule at 10 am | Estimated Occupancy | Room Temperature Rate of Change (per 5 minutes) | Outside Air Temp | Outlier | Schedule Estimated CFM |
|---|---|---|---|---|---|
| Monday | 40 | .5 | 70 | No | 80 |
| Tuesday | 40 | 1 | 71 | Yes | uses comparison date |
| Wednesday | 40 | .5 | 70 | No | 80 |
| Thursday | 40 | 1 | 72 | Yes | uses comparison date |
| Friday | 40 | .5 | 69 | No | 80 |
| Comparison Date | 100 | 1 | 72 | — | 200 |

In Table 3, although the imported schedule shows 40 people for each day, the rate of temperature change for each of Tuesday and Thursday is higher than the rate of change for Monday, Wednesday, and Friday. Based on the rate of change of the room temperature and the outside air temperature, the facility can retrieve a record for another date that matches or is closer to those values and check to see if the occupancy set on that date was higher. If so, the facility can use the occupancy and/or cfm settings from the retrieved record to determine a different lower limit cfm for the current period. For example, the facility may calculate a distance between the Room Temperature rate of change and outside air temperature for an outlier date and each of the records in the dataset, select the record having the smallest distance to the outlier date, and then employ the ventilation settings for the selected record. For example, one technique for calculating the distance between Thursday ("TH") and the Comparison Date ("CD") is as follows:

$$\sqrt{(\text{RateofChange}_{TH}-\text{RateofChange}_{CD})^2+(\text{AirTemp}_{TH}-\text{Airtemp}_{CD})^2}$$

or $$\sqrt{(1-1)^2+(71-71)^2}=0.$$

One of ordinary skill in the art will recognize that the distance between historical settings/conditions and current or forecasted settings/conditions can be determined based on any number of dimensions (i.e., settings/conditions), such as size (area or volume), location, the direction(s) that windows or other surfaces in a zone face, and so on, Using Occupant Feedback to Improve Accuracy of Estimate The accuracy of the system could be increased by an occupant providing the current occupancy in the room either through a web application or other device. For example, a teacher in a classroom could enter the current attendance of the class, and this could be used to change the occupancy number used for the ventilation calculations.

Figure 1:
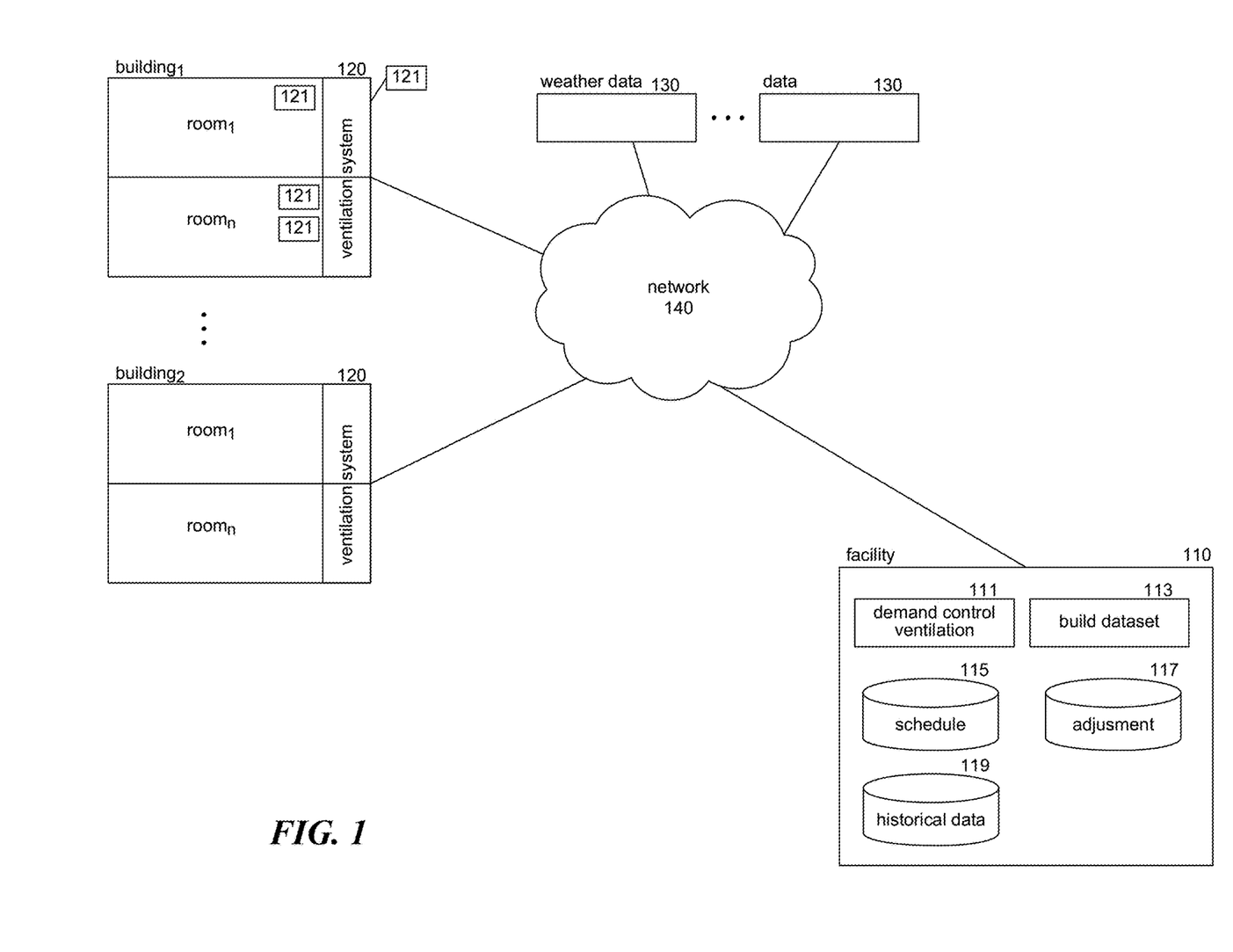
FIG. 1 is a block diagram illustrating the environment in which the disclosed facility may operate.

FIG. 1 is a block diagram illustrating the environment in which the disclosed facility may operate in accordance with some embodiments of the disclosed technology. In this example, environment 100 includes facility 110, buildings 120, data sources 130, and network(s) 140. Facility 110 includes demand control ventilation component 111, build dataset 113, schedule store 115, and adjustment store 117, and historical data store 119. Demand control ventilation component 111 is invoked by the facility to import a schedule for a room or building and to control a corresponding ventilation system in accordance with the disclosed technology. Build dataset component 113 is invoked by the facility to collect historical data for a room and/or building, such as historical occupancy values, ventilation settings, external or environmental variable measurements, rates of temperature change, etc. and store this information in, for example, historical data store 119. Schedule store 115 stores occupancy values and/or temperature settings for a room or building for one or more periods of time, such as a daily, weekly, monthly, yearly, or ad hoc schedule. Adjustment store 117 stores associations between external variables and ventilation adjustments and/or related formulas. For example, the facility may store an equation for converting humidity values to cfm adjustments and/or concrete values associated with different humidity values. Historical data store 119 stores historical information about the conditions and settings within a room or building over time including, for example, historical occupancy values, ventilation settings, external or environmental variable measurements, rates of temperature change, etc. Buildings 120 represent the buildings and rooms that are subject to control by the facility in this environment. Each building 120 includes a number of rooms and a ventilation system. In some cases, a building and/or room may include one or more sensors 121 for providing additional information about conditions within or otherwise affecting a room or building, such as a temperature sensor, humidity sensor, luminance sensor, occupancy sensor, etc. In this example, the facility is depicted as being remote from the buildings. However, in some environments the facility may be operated from one or more of the buildings. Furthermore, some environments may include multiple facilities, such as one or more facilities installed and operated at one building and dedicated to that building and one or more remote facilities configured to control ventilation systems for buildings that do not have facilities installed therein. Data providers 130 provide access to information that the facility may use to enhance the control of ventilation systems, such as weather information (e.g., forecasts and actual values of temperature, humidity), sun information (e.g., sunrise, sunset, position, path), and so on provided by, for example, owners/operators of buildings, third parties, etc. Network 140 represents communications links over which the various elements of environment 100 may communicate, such as the Internet, a local area network, and so on.

In various examples, these computer systems and other devices 100 can include server computer systems, desktop computer systems, laptop computer systems, netbooks, tablets, mobile phones, personal digital assistants, televisions, cameras, automobile computers, electronic media players, and/or the like. In some embodiments, the facility may operate on specific-purpose computing systems, such as an HVAC controller, an electronic thermostat, a ventilation control unit, and so on. In various examples, the computer systems and devices include one or more of each of the following: a central processing unit ("CPU") configured to execute computer programs; a computer memory configured to store programs and data while they are being used, including a multithreaded program being tested, a debugger, the facility, an operating system including a kernel, and device drivers; a persistent storage device, such as a hard drive or flash drive configured to persistently store programs and data; a computer-readable storage media drive, such as a floppy, flash, CD-ROM, or DVD drive, configured to read programs and data stored on a computer-readable storage medium, such as a floppy disk, flash memory device, CD-ROM, or DVD; and a network connection configured to connect the computer system to other computer systems to send and/or receive data, such as via the Internet, a Local Area Network (LAN), a Wide Area Network (WAN), a point-to-point dial-up connection, a cell phone network, or another network and its networking hardware in various examples including routers, switches, and various types of transmitters, receivers, or computer-readable transmission media. While computer systems configured as described above may be used to support the operation of the facility, those skilled in the art will readily appreciate that the facility may be implemented using devices of various types and configurations, and having various components. Elements of the facility may be described in the general context of computer-executable instructions, such as program modules, executed by one or more computers or other devices. Generally, program modules include routines, programs, objects, components, data structures, and/or the like configured to perform particular tasks or implement particular abstract data types and may be encrypted. Furthermore, the functionality of the program modules may be combined or distributed as desired in various examples. Moreover, display pages may be implemented in any of various ways, such as in C++ or as web pages in XML (Extensible Markup Language), HTML (HyperText Markup Language), JavaScript, AJAX (Asynchronous JavaScript and XML) techniques, or any other scripts or methods of creating displayable data, such as the Wireless Access Protocol (WAP). Typically, the functionality of the program modules may be combined or distributed as desired in various embodiments, including cloud-based implementations, web applications, mobile applications for mobile devices, and so on.

The following discussion provides a brief, general description of a suitable computing environment in which the invention can be implemented. Although not required, aspects of the invention are described in the general context of computer-executable instructions, such as routines executed by a general-purpose data processing device, e.g., a server computer, wireless device, or personal computer. Those skilled in the relevant art will appreciate that aspects of the invention can be practiced with other communications, data processing, or computer system configurations, including: Internet appliances, hand-held devices (including personal digital assistants (PDAs)), wearable computers (e.g., fitness-oriented wearable computing devices), all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed computing environments where functions or modules are shared among disparate processing devices, which are linked through a communications network such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other computer-readable storage media. Alternatively, computer-implemented instructions, data structures, screen displays, and other data under aspects of the invention may be distributed over the Internet or over other networks (including wireless networks), on a propagated signal on a propagation medium (e.g., electromagnetic wave(s), sound wave, etc.) over a period of time, or they may be provided on any analog or digital network (packet switched, circuit switched, or other scheme). Furthermore, the term computer-readable storage medium does not encompass signals (e.g., propagating signals) or transitory media.

Figure 2:
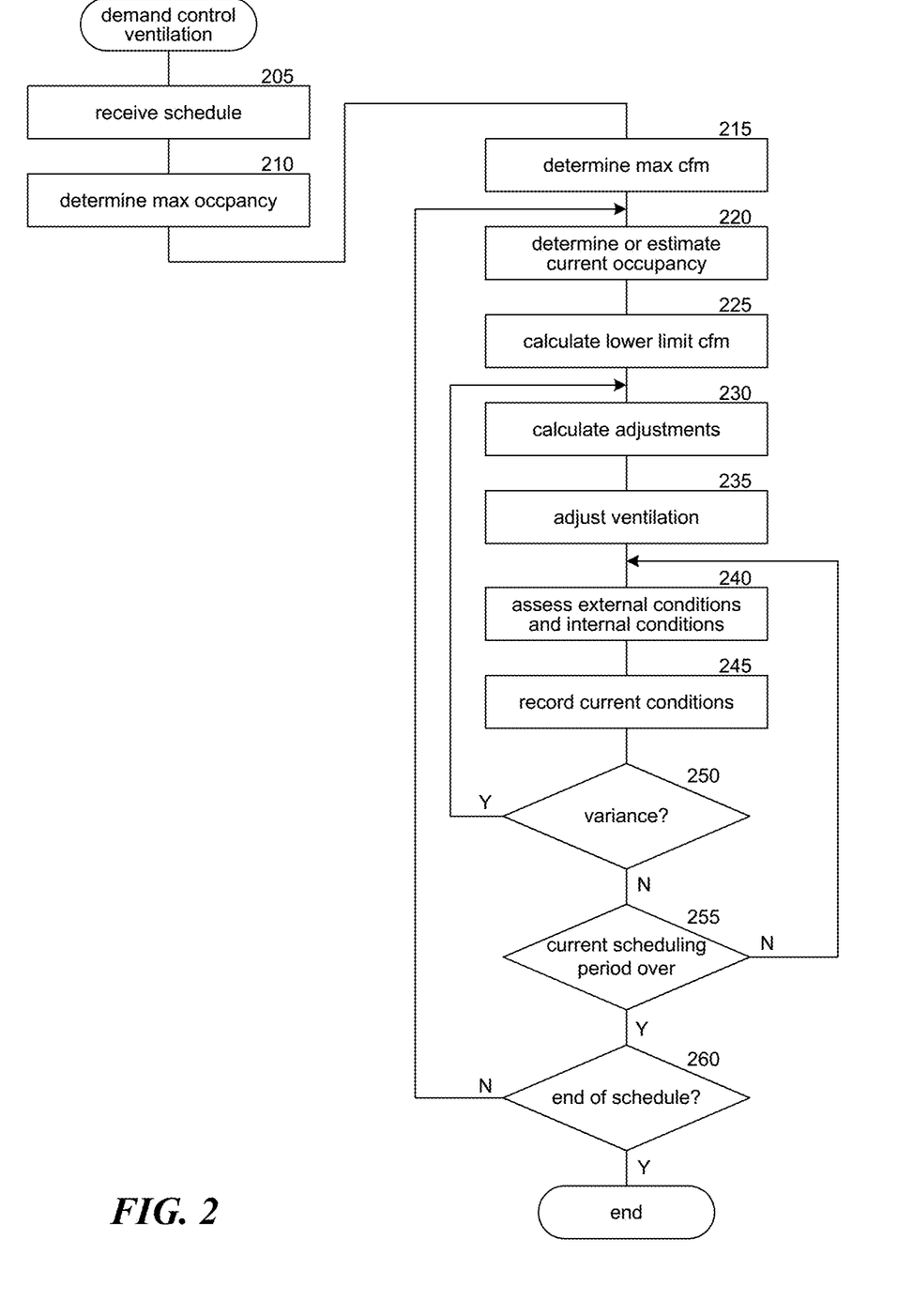
FIG. 2 is a flow diagram illustrating the processing of a demand control ventilation component of the disclosed facility.

FIG. 2 is a flow diagram illustrating the processing of a demand control ventilation component of the disclosed facility in accordance with some embodiments of the disclosed technology. The component is invoked to control ventilation into a "zone" (e.g., a building, room, group of rooms, and so on) based on occupancy (actual or estimated) and max ventilation cfm for that zone. In block 205, the component receives a schedule for the zone, which represents the expected occupancy for the zone over various scheduling periods (e.g., minutes, hours, days, months, etc.). The schedule may be generated by a user or automatically based on historical data for the zone. In block 210, the component determines a maximum occupancy for the zone. For example, a user may enter this value from building specifications, based on a maximum occupancy sign within the zone. As another example, the facility may query a thermostat or other device within the zone, or otherwise associated with the zone, for this information. In block 215, the component determines a maximum cfm for the zone. For example, the user enters a cfm per occupant (based on, for example, Industry standards, law, user preferences, and so on), which can be multiplied by the maximum occupancy to determine the maximum cfm. In block 220, the component determines or estimates a current occupancy for the zone based on the received schedule and/or occupancy sensors in the zone. In block 225, the component calculates a lower limit cfm for the zone based on the determined or estimated occupancy, the determined max occupancy, and the determined max cfm. In block 230, the component calculates cfm adjustments for the ventilation system based on information stored in the cfm adjustment library and any additional data the facility has collected from the system. For example, if the facility has access to humidity data (e.g., via a humidity sensor and/or a third party resource) and the cfm adjustment library includes a value or formula for the humidity level, then the component can generate a cfm adjustment for the humidity value. If the cfm adjustment library does not include any data for available external or environment variables, then the component may skip this step. In block 235, the component adjusts ventilation in the zone based on the calculated lower limit cfm and cfm adjustments (if any) by, for example, adjusting (e.g., opening, closing, or modifying) a vent into the zone, increasing or decreasing the speed of a fan, closing any mechanical doors or other connected sources of airflow. In block 240, the component assesses external and internal conditions relative to the zone, such as temperature, rate of change of zone temperature, weather conditions, and so on. In block 245, the component records the current conditions (both external and internal) in a data store, such as a historical data store. In some embodiments, the collection and storage of historical data may be performed contemporaneously by a separate task, such as a build dataset component. In decision block 250, if there is a variance between expected conditions and measured conditions, then the facility loops back to block 230 to calculate adjustments and adjust the ventilation in the zone based on the variance, else the component continues at decision block 255. For example, if the rate of change of the temperature within the zone exceeds a predetermined or average value for the zone or for similar zones (e.g., zones having similar sizes or maximum occupancies), then the component can adjust the ventilation to increase airflow into the zone. In decision block 255, if the current scheduling period is over, then the component continues at decision block 260, else the component loops back to block 240 to assess external and internal conditions relative to the zone. In decision block 260, if the end of the schedule has been reached, then processing of the component completes, else the component loops back to block 220 to determine or estimate a new current occupancy for the next scheduling period. In some embodiments, a means for providing demand control ventilation comprises one or more computers or processors configured to carry out an algorithm disclosed in FIG. 2 and this paragraph.

Example System Workflow

Figure 3:
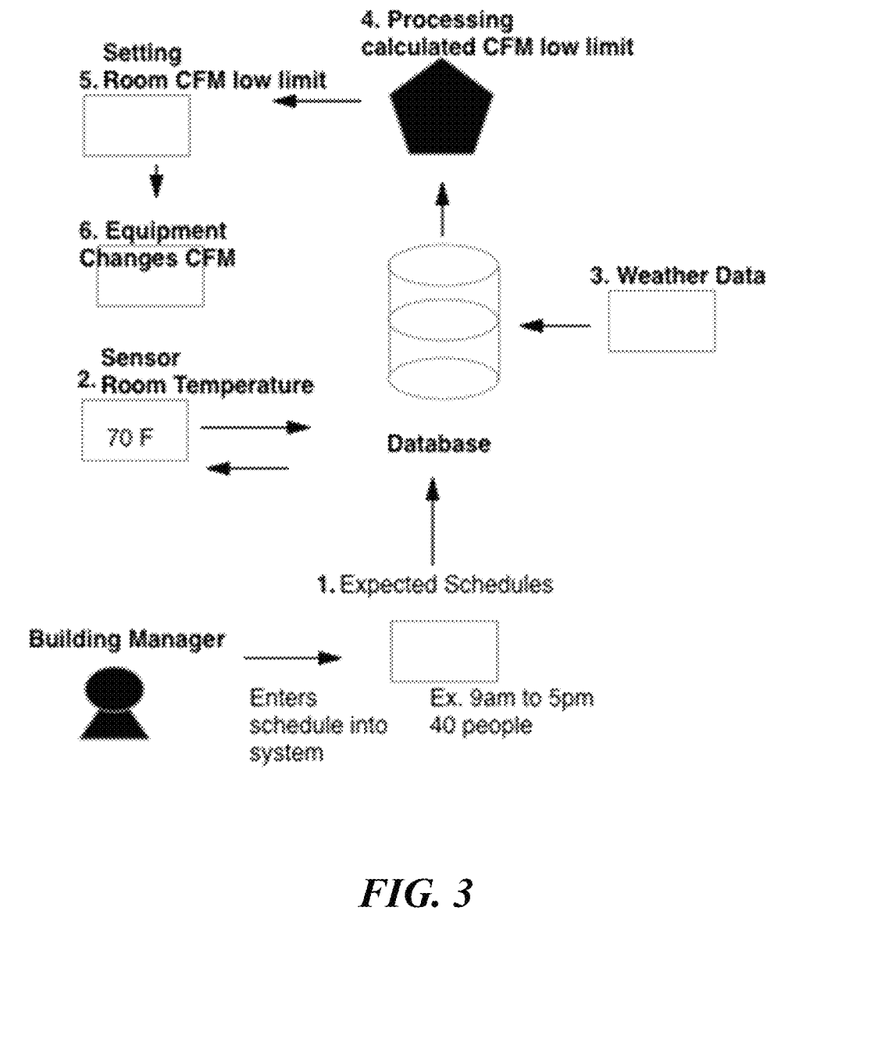
FIG. 3 is a flow diagram illustrating the steps of an example system workflow of the disclosed facility.

FIG. 3 is a flow diagram illustrating the steps of an example system workflow of the disclosed facility in accordance with some embodiments of the disclosed technology. In step 1 the building manager (or another user) enters a schedule with estimated occupancies for the rooms. In step 2, the room temperature is sampled from the room and sent to the database. In step 3, the facility collects data related to external and/or environmental conditions, such as outside air temperature, humidity, etc. In step 4, the facility retrieves schedule data, sensor data, and weather data and calculates a cfm for the room (e.g., a recommended low limit cfm) based on estimated or actual occupancy and, in some cases, any cfm adjustments. In steps 5 and 6, the facility sends the recommended low limit cfm to the equipment so that the equipment is controlled to adjust the cfm in the corresponding space based on the low limit cfm settings. In some embodiments, the facility may further comprise a visual display processor configured to: receive one or more occupancy estimates, allow a user to upload or change an occupancy estimate, create a ventilation performance display configured to communicate one or more of the results of ventilation (e.g., current and/or previous ventilation settings, a reason for any change, such as "rate of change of temperature too high," "new scheduling period," and so on), and provide the created ventilation performance display to a display device. In some embodiments, the facility may color code the communication based on the ventilation settings, such a red for ventilation settings that are more than 80% of the maximum cfm per occupant, yellow between 50% and 80%, and green for 0% to 50%. One of ordinary skill in the art will recognize that the communications may be manipulated (such as changes to size, font, format, movement, display length, etc.) in other ways to highlight various ventilation settings and/or conditions.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples of the invention are described above for illustrative purposes, various equivalent modifications are possible within the scope of the invention, as those skilled in the relevant art will recognize. For example, while processes or blocks are presented in a given order, alternative implementations may perform routines having steps or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges. Furthermore, although certain steps, functions, or functionalities may be described herein as being performed by or at a particular device, various steps, functions, functionalities, or portions thereof may be performed at other devices. For example, display previews may be generated at a server or client device.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims. In some cases, various steps in the algorithms discussed herein may be added, altered, or removed without departing from the disclosed subject matter. Those skilled in the art will appreciate that features described above may be altered in a variety of ways. For example, the order of the logic may be rearranged, sublogic may be performed in parallel, illustrated logic may be omitted, other logic may be included, etc.

To reduce the number of claims/examples, certain aspects of the invention are presented below in certain claim forms, but the applicant contemplates the various aspects of the invention in any number of claim forms. For example, while an aspect of the invention may be recited as a means-plus-function claim under 35 U.S.C. § 112(f), other aspects may likewise be embodied as a means-plus-function claim or in other forms, such as being embodied in a computer-readable medium. (Any claims intended to be treated under 35 U.S.C. § 112(f) will begin with the words "means for," but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

We claim:

1. A heating, ventilation, and air conditioning controller configured to provide demand ventilation control, the heating, ventilation, and air conditioning controller comprising:
   a component configured to receive one or more schedules for a zone within a building having a ventilation system;
   a ventilation settings component configured to, for each of a plurality of scheduling periods,
      determine a current rate of indoor temperature change for the zone,
      estimate an occupancy for the zone based at least in part on the determined current rate of indoor temperature change for the zone, and
      determine at least one ventilation setting for the zone based at least in part on the retrieved estimate of occupancy;
   wherein the ventilation settings component is further configured to, during each scheduling period,
      retrieve, from a historical data store, historical data for the zone, wherein the historical data includes a rate of temperature change for the zone during a previous period;
      compare a current rate of temperature change for the zone to the rate of temperature change for the zone during the previous period; and
      in response to determining that a difference between the current rate of temperature change for the zone and the rate of temperature change for the zone during the previous period exceeds a predetermined threshold, determine at least one adjustment to the determined at least one ventilation setting; and
   a component configured to adjust the ventilation system in accordance with the determined at least one ventilation setting, wherein adjusting the ventilation system in accordance with the determined at least one ventilation setting comprises manipulating at least one mechanical element of the ventilation system.

2. The heating, ventilation, and air conditioning controller of claim 1, wherein the at least one mechanical element of the ventilation system includes a fan such that adjusting the ventilation system in accordance with the determined at least one ventilation setting comprises adjusting a speed of the fan.

3. The heating, ventilation, and air conditioning controller of claim 1, wherein the at least one mechanical element of the ventilation system includes a vent such that adjusting the ventilation system in accordance with the determined at least one ventilation setting comprises opening or closing the vent.

4. The heating, ventilation, and air conditioning controller of claim 1, wherein the at least one mechanical element of the ventilation system includes a vent such that adjusting the ventilation system in accordance with the determined at least one ventilation setting comprises adjusting the vent.

5. The heating, ventilation, and air conditioning controller of claim 1, wherein the ventilation settings component is further configured to, for each scheduling period, determine a maximum ventilation value for the zone during the scheduling period based at least in part on a maximum occupancy value for the zone.

6. The heating, ventilation, and air conditioning controller of claim 1, further comprising a fan configured to, for each scheduling period, operate in accordance with an airflow rate determined for the scheduling period.

7. The heating, ventilation, and air conditioning controller of claim 1, wherein the at least one ventilation setting includes an airflow rate of outside air into the zone.

8. A computer readable storage medium storing instructions for providing demand ventilation control that, when executed by a computing system having a memory and a processor, cause the computing system to perform a method, the method comprising:
   receiving one or more schedules for a zone within a building having a ventilation system;
   for each of a plurality of scheduling periods,
      determining a current rate of indoor temperature change for the zone,
      estimating an occupancy for the zone based at least in part on the determined current rate of indoor temperature change for the zone, and
      determining at least one ventilation setting for the zone based at least in part on the estimated occupancy for the zone;
   controlling a fan of the ventilation system in accordance with the determined at least one ventilation setting;
   retrieving, from a historical data store, historical data for the zone, wherein the historical data includes a rate of temperature change for the zone and outside air temperature during one or more previous periods;
   determining a current rate of temperature change for the zone and a current outside air temperature for the zone;
   for each of the one or more previous periods,
      calculating a distance between the previous period and a current period based at least in part on the current rate of temperature change for the zone, the current outside air temperature for the zone, a rate of temperature change for the zone during the previous period, and the outside air temperature during the previous period;

identifying the previous period with the smallest distance to the current period; and adjusting the ventilation system in accordance with ventilation settings associated with the identified previous period.

9. The computer readable storage medium of claim 8, the method further comprising:

receiving an indication of the actual occupancy of the zone; and determining at least one ventilation setting for the zone based at least in part on the received actual occupancy.

10. The computer readable storage medium of claim 8, the method further comprising:

controlling a vent of the ventilation system in accordance with the determined at least one ventilation setting.

11. The computer readable storage medium of claim 8, the method further comprising:

receiving, from a first sensor, a luminosity measure for the zone;

retrieving, from an adjustment library, an adjustment factor for luminosity; and adjusting at least one ventilation setting for the zone based at least in part on the luminosity measure and the adjustment factor for luminosity.

12. A method of providing demand control ventilation, the method comprising:

receiving a schedule for one or more zones; and for each of the one or more zones, determining a maximum ventilation value for the zone, determining a maximum occupancy for the zone, estimating a current occupancy for the zone based at least in part on a rate of change of indoor temperature in the zone, calculating a lower limit ventilation value for the zone based at least in part on the determined maximum ventilation value for the zone, the determined maximum occupancy for the zone, and the estimated current occupancy for the zone, adjusting ventilation for the zone based on the calculated lower limit ventilation value;

assessing external and internal conditions for a first zone, the assessing comprising:

calculating a rate of change of indoor temperature in the first zone, and determining a variance between an assessed condition and an estimated value at least in part by determining a difference between the calculated rate of change and a historical value for the rate of change of indoor temperature in the first zone;

in response to determining that the difference between the calculated rate of change and the historical value for the rate of change of indoor temperature in the first zone exceeds a predetermined threshold, invoking a safety fallback setting for the first zone to increase ventilation into the first zone.

13. A method of providing demand control ventilation, the method comprising:

receiving a schedule for one or more zones; and for each of the one or more zones, determining a maximum ventilation value for the zone, determining a maximum occupancy for the zone, estimating a current occupancy for the zone based at least in part on a rate of change of indoor temperature in the zone, calculating a lower limit ventilation value for the zone based at least in part on the determined maximum ventilation value for the zone, the determined maximum occupancy for the zone, and the estimated current occupancy for the zone, adjusting ventilation for the zone based on the calculated lower limit ventilation value, wherein calculating a lower limit ventilation value for a first zone of the one or more zones comprises multiplying the maximum occupancy determined for the first zone by the ratio of the current occupancy estimated for the first zone to the maximum ventilation value determined for the first zone.

14. The method of claim 13, further comprising:

assessing external and internal conditions for a first zone, the assessing comprising:

calculating a rate of change of indoor temperature in the first zone, and determining a variance between an assessed condition and an estimated value at least in part by determining a difference between the calculated rate of change and a historical value for the rate of change of indoor temperature in the first zone.

15. The method of claim 13, wherein adjusting ventilation for a first zone based on the calculated lower limit ventilation value comprises at least one of adjusting a fan speed and adjusting a vent.

16. The method of claim 13, further comprising:

for each of a plurality of previous scheduling periods, calculating a distance between:

a) a current set of ventilation settings and conditions for a first zone, and b) a set of ventilation settings and conditions for the first zone during a previous scheduling period.

17. The method of claim 13, further comprising:

in response to determining a variance between an assessed condition within the zone and an estimated value for the condition, adjusting ventilation for the zone based on the variance.

18. A method of providing demand control ventilation, the method comprising:

receiving a schedule for one or more zones; and for each of the one or more zones, determining a maximum ventilation value for the zone, determining a maximum occupancy for the zone, estimating a current occupancy for the zone based at least in part on a rate of change of indoor temperature in the zone, calculating a lower limit ventilation value for the zone based at least in part on the determined maximum ventilation value for the zone, the determined maximum occupancy for the zone, and the estimated current occupancy for the zone, and adjusting ventilation for the zone based on the calculated lower limit ventilation value;

determining a current rate of temperature change for a first zone;

identifying, from among historical data for the first zone, one or more previous scheduling periods during which the rate of temperature change for the first zone was similar to the determined current rate of temperature change for the first zone;

identifying ventilation settings for at least one of the one or more previous scheduling periods during which the rate of temperature change for the first zone was similar to the determined current rate of temperature change for the first zone; and adjusting ventilation for the first zone based on at least one set of the identified ventilation settings.

19. The method of claim 18, wherein the current rate of temperature change for the first zone is determined to be similar to the rate of temperature change for the first zone during a previous scheduling period if their difference is less than a predetermined threshold.

20. The method of claim 19, wherein the predetermined threshold is less than 0.06 degrees per minute.

* * * * *